United States Patent
Kommrusch et al.

(10) Patent No.: US 7,426,621 B2
(45) Date of Patent: Sep. 16, 2008

(54) MEMORY ACCESS REQUEST ARBITRATION

(75) Inventors: Steven J. Kommrusch, Fort Collins, CO (US); Brett A. Tischler, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 231 days.

(21) Appl. No.: 11/297,856

(22) Filed: Dec. 9, 2005

(65) Prior Publication Data
US 2007/0136545 A1    Jun. 14, 2007

(51) Int. Cl.
*G06F 13/28* (2006.01)

(52) U.S. Cl. .................. 711/169; 711/150; 711/151; 711/167; 711/168; 710/36; 710/39; 710/40; 710/124

(58) Field of Classification Search .................. None
See application file for complete search history.

(56) References Cited

U.S. PATENT DOCUMENTS

| | | | |
|---|---|---|---|
| 5,754,800 A | * | 5/1998 | Lentz et al. ............... 710/116 |
| 6,088,772 A | | 7/2000 | Harriman et al. |
| 6,145,065 A | | 11/2000 | Takahashi et al. |
| 6,272,583 B1 | | 8/2001 | Sakugawa et al. |
| 6,564,304 B1 | * | 5/2003 | Van Hook et al. ............ 711/154 |
| 2002/0188811 A1 | * | 12/2002 | Ma et al. ..................... 711/151 |
| 2003/0061459 A1 | | 3/2003 | Aboulenein et al. |
| 2003/0126380 A1 | * | 7/2003 | Mastronarde et al. ....... 711/151 |
| 2003/0177296 A1 | * | 9/2003 | Kurth ......................... 710/244 |
| 2004/0243768 A1 | | 12/2004 | Dodd et al. |

FOREIGN PATENT DOCUMENTS

EP    0901080 A1    3/1999

\* cited by examiner

*Primary Examiner*—Hyung Sough
*Assistant Examiner*—Kaushikkumar Patel (57) ABSTRACT

A method includes receiving a first memory access request from a first device during a first interval. The first memory access request is to access a first page of a multiple-page memory. The method further includes receiving a second memory access request from the first device during a second interval subsequent to the first interval and receiving a third memory access request from a second device during the second interval. The method additionally includes preferentially selecting the second memory access request over the third memory access request for provision to the multiple-page memory if an indicator indicates the second memory access request is expected to access the first page of the multiple-page memory.

15 Claims, 5 Drawing Sheets

MEMORY ACCESS REQUEST ARBITRATION

FIELD OF THE DISCLOSURE

The present disclosure relates generally to processing memory access requests.

BACKGROUND

Memory controllers frequently are utilized in processing systems to control access to memory resources for devices seeking to store data to memory or access data from memory. In conventional systems, memory access requests are supplied to a memory controller based on certain fixed priorities. However, the selection for memory access requests based solely on a fixed prioritization scheme often can introduce significant penalties in page-based memories, such as dynamic random access memories (DRAM). Typically, a delay is introduced whenever a different page of a DRAM is accessed due to the process required to close the previous page and open the next page. Frequent switching between pages of memory, as typically occurs in a fixed prioritization scheme, therefore often results in "thrashing" in the memory and, consequently, introduces a significant cumulative delay in memory access request sequences. This problem is especially pronounced in dual data rate (DDR) memories due to their higher data rates per command cycle.

Accordingly, an improved technique for processing memory access requests would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

The following description is intended to convey a thorough understanding of the present disclosure by providing a number of specific embodiments and details involving the arbitration of memory access requests. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

In accordance with one aspect of the present disclosure, a method is provided. The method includes receiving a first memory access request from a first device during a first interval. The first memory access request is to access a first page of a multiple-page memory. The method further includes receiving a second memory access request from the first device during a second interval subsequent to the first interval and receiving a third memory access request from a second device during the second interval. The method additionally includes preferentially selecting the second memory access request over the third memory access request for provision to the multiple-page memory if an indicator indicates the second memory access request is expected to access the first page of the multiple-page memory.

In accordance with another aspect of the present disclosure, a system is provided. The system includes an access arbiter coupled to a multiple-page memory. The access arbiter is to receive a first memory access request from a first device during a first interval, the first memory access request to access a first page of a multiple-page memory, receive a second memory access request from the first device during a second interval subsequent to the first interval, and receive a third memory access request from a second device during the second interval. The access arbiter further is to preferentially select the second memory access request over the third memory access request for provision to the multiple-page memory if an indicator indicates the second memory access request is expected to access the first page of the multiple-page memory.

Figure 1:
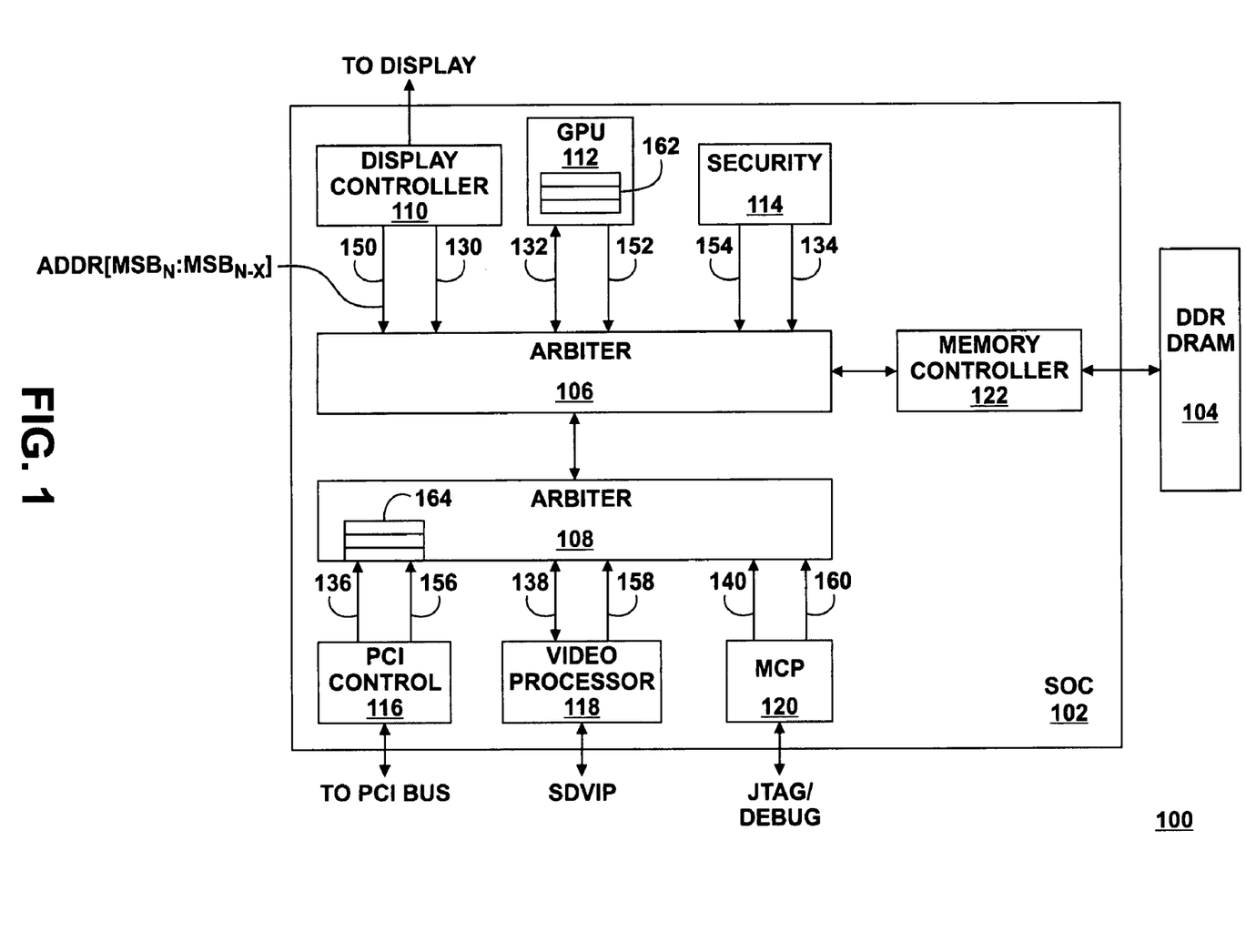
FIG. 1 is a block diagram illustrating an exemplary processing system using a persistent page memory access request arbitration technique in accordance with at least one embodiment of the present disclosure.

Referring to FIG. 1, an exemplary processing system 100 utilizing repeated-page access arbitration is illustrated in accordance with at least one embodiment of the present disclosure. In the depicted example, the system 100 includes a system on a chip (SOC) 102 (e.g., an integrated processor) connected to a page-based memory 104 having a plurality of pages (such as, for example, a DDR DRAM). The SOC 102 includes north arbiter 106, south arbiter 108, and a plurality of devices. The plurality of devices can include, for example, a display controller 110, a general processing unit (GPU, also frequently referred to as a central processing unit), a security module 114, a peripheral component interconnect (PCI) controller 116, a video processor 118, a bridge (MCP) 120 and a memory controller 122.

In the illustrated example, the south arbiter 108 arbitrates between memory access requests provided by one or more of the devices 116, 118 and 120 (via, e.g., request paths 136, 138 and 140, respectively) and provides the selected memory access request for each memory access interval to the north arbiter 106. In turn, the north arbiter 106 arbitrates between memory access requests provided by one or more of the devices 110, 112 and 114 (via, e.g., request paths 130, 132 and 134, respectively), as well as the selected memory access request provided by the south arbiter 108. The memory access request selected by the arbiter 106 then is provided to the memory controller 122, along with any data associated with the selected memory access request (such as write data). The memory controller 122 then processes the provided memory access request to load data to, or read data from, the identified memory location(s) of the memory 104.

In at least one embodiment, one or both of the arbiters 106 and 108 utilize one or more of the arbitration techniques described herein to select a memory access request so as to reduce the frequency of page switches at the memory 104. The arbitration scheme utilized by the arbiters 106 and 108 can include, for example, the selection of a particular memory access request based on an indication that that the selected memory access request is expected to access the same memory page as the memory access request selected for the previous interval. In one embodiment, this indication may be based on a comparison of at least a portion of the address associated with the previously selected memory access request and the corresponding portion of the addresses of one or more pending memory access requests. In the event that the comparison indicates that a particular pending memory access request is expected to access the same memory page as the previous memory access request, the particular pending memory access request may be preferentially selected for processing during the memory access interval. The term "preferentially," when used in the context of memory access request selection, refers to memory access request selection assuming all other parameters of significance are substantially equal. For example, in the event that one memory access request has a higher priority than another, in instances where priority is the deciding factor, the higher priority memory access request may be selected even if the selection of the lower priority memory access request is preferential in view of other parameters.

In one embodiment, one or both of the arbiters 106 and 108 perform this comparison. To illustrate, one or both of the arbiters 106 and 108 can store a subset of the most significant bits (MSBs) of the address associated with the immediately previous processed memory access request (e.g., $ADDR_p[MSB_n:MSB_{n-x}]$) in a register or other memory location (not shown) and the devices 130, 132, 134, 136, 138 and 140 can provide a corresponding subset of the most significant bits (MSBs) of the memory address associated with their memory access request (e.g., $ADDR_i[MSB_n:MSB_{n-x}]$ for device i) as address inputs 150, 152, 154, 156, 158 and 160, respectively. One or both of the arbiters 106 and 108 then may processes the address inputs in view of the stored address value to identify a memory access request that is expected to access the same memory page as the processed memory access request. In another embodiment, the comparison of the address portions can be performed by the devices, and each device can provide a signal as an indicator of whether the memory access request provided by the device is expected to access the same memory page as the previously processed memory access request.

In many instances, a current memory access request from a device is likely to access the same page of memory as the immediately prior memory access request from the same device. Accordingly, in one embodiment, one or both of the arbiters 106 and 108 preferentially select among memory access requests such that memory access requests are sequentially selected from the same device, if available, up to a predetermined maximum number of sequential memory access requests. Thus, by sequentially selecting memory access requests from the same device, the frequency of page switches at the memory 104 may be reduced due to the increased likelihood of accessing the same memory pages that can result from the sequential processing of memory access requests from the same device.

Similarly, in one embodiment, one or both of the arbiters 106 and 108 can employ an arbitration scheme whereby memory access requests from the devices are buffered until the number of memory access requests from a particular device meets or exceeds a predetermined number and/or until the amount of data (e.g., read data for read accesses or write data for write accesses) associated with the buffered memory access requests from a particular device meets or exceeds a predetermined threshold. When the predetermined number of requests is met and/or the predetermined data threshold is met for the buffered memory access requests of a particular device, the arbiter can select some or all of the buffered memory access requests for processing during sequential memory access intervals. As memory access requests from the same device often access the same memory page, the sequential processing of one or more memory access requests from a device may reduce the frequency of page switches, thereby reducing delay in the processing of memory access requests.

In one embodiment, the memory access requests from the devices are buffered at the arbiters 106 and 108 until the predetermined number of requests is met and/or the predetermined data threshold is met. As exemplarily illustrated, the arbiter 108 can include a buffer 164 to buffer the predetermined number of memory access requests from the PCI controller 116. When the buffer 164 is full, the arbiter 108 then can preferentially select some or all of the buffered memory access requests from the buffer 164 for sequential processing. In an alternate embodiment, one or more of the devices include buffers (e.g., buffer 162 of the GPU 112) to buffer memory access requests. In this instance, the devices can signal to the arbiters 106 or 108 when the buffered access requests meet the predetermined number of buffered access requests and/or the predetermined data threshold. In response, the corresponding arbiter can preferentially select one or more of the buffered memory access requests from the signaling device for sequential processing.

Figure 2:
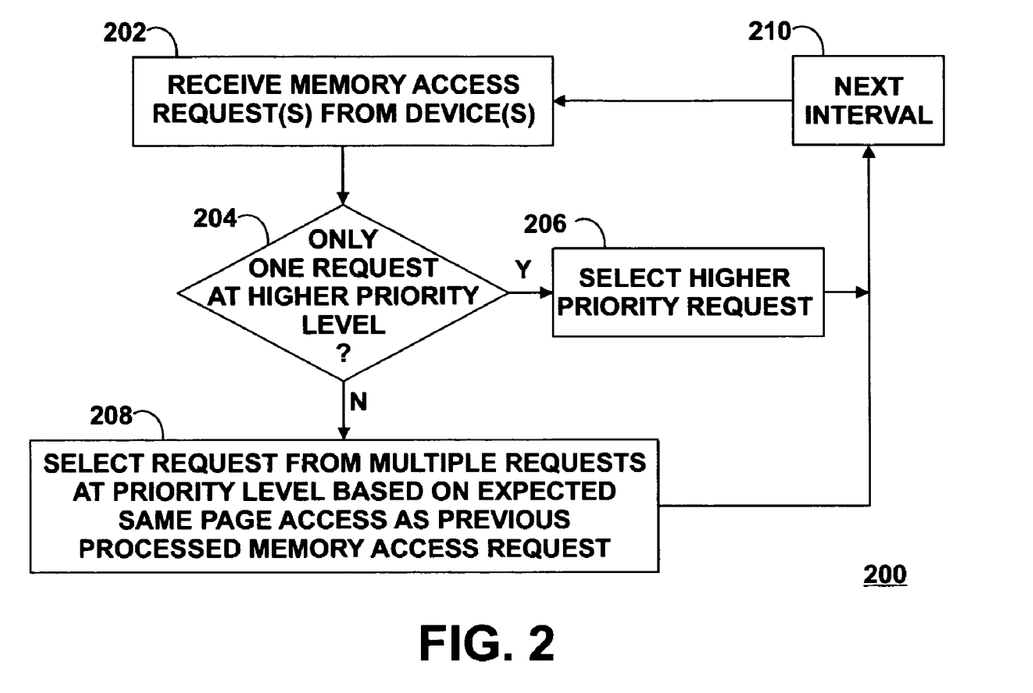
FIG. 2 is a flow diagram illustrating an exemplary method for persistent page memory access request arbitration in accordance with at least one embodiment of the present disclosure.

Referring to FIG. 2, an exemplary method 200 for arbitrating between memory access requests so as to reduce memory page switches is illustrated in accordance with at least one embodiment of the present disclosure. At block 202, a memory access request is received at an arbiter (e.g., arbiters 106 and 108, FIG. 1) from each of one or more devices. At block 204, the arbiter examines the priorities, if any, associated with the received memory access requests. To illustrate, a memory access request from the GPU 112 (FIG. 1) may be assigned a higher priority than a memory access request from the display controller 110 (FIG. 1) due to timing or performance requirements. In the event that there is only one received memory access request that has a higher priority than the remaining received memory access requests, this single higher priority memory access request can be selected at block 206 for provision to a memory controller (e.g., memory controller 122, FIG. 1) for processing during the present memory access interval or an upcoming memory access interval.

In the event that there are multiple memory access requests at the highest priority level present among the received memory access requests, in one embodiment, the arbiter selects the memory access request that is expected to result in the access of the same memory page as the memory access request selected for the previous memory access interval at block 208. The selected memory access request then may be provided to the memory controller for processing. The arbitration method 200 then can be repeated at step 210 for the next memory access interval.

Referring to FIGS. 3-6, exemplary implementations of the preferential memory access request selection at block 208 of the method 200 of FIG. 2 are illustrated in accordance with at least one embodiment of the present disclosure. A memory access arbiter may utilize any of these exemplary implementations, or any combinations thereof, without departing from the scope of the present disclosure.

Figure 3:
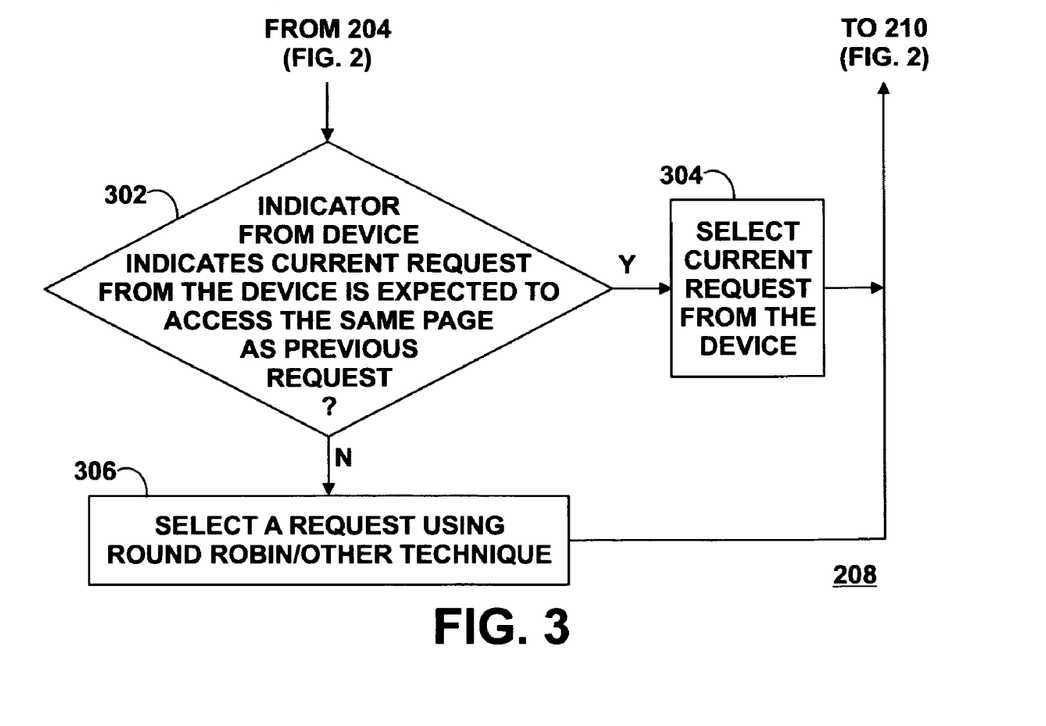
FIG. 3 is a flow diagram illustrating an exemplary implementation of the method of FIG. 2 based on a multiple round robin selection scheme in accordance with at least one embodiment of the present disclosure.

As depicted by FIG. 3, one implementation of the preferential memory access request selection at block 208 can include determining whether an indicator from a device indicates that the current request from the device is expected to access the same memory page as the memory access request selected during the previous memory access interval at block 302. As discussed, the indicator can be based on a comparison of a subset of the address associated with a memory access request with the corresponding address subset of the previously selected memory access request. In the event that there is such an indicator, the memory access request from the device associated with the indicator is selected at block 304 for provision to a memory controller for processing at block 304. In the event that no such indicator is present, the arbiter can select a memory access request for processing utilizing another scheme, such as by round robin selection, at block 306.

Table 1 illustrates an exemplary sequence of memory access intervals utilizing memory access arbitration as described with respect to FIG. 3. In the depicted example, device A with priority 0 and a sequential indicator is preferentially selected over a priority 0 device three times and ahead of a priority 1 device once.

TABLE 1

Figure 4:
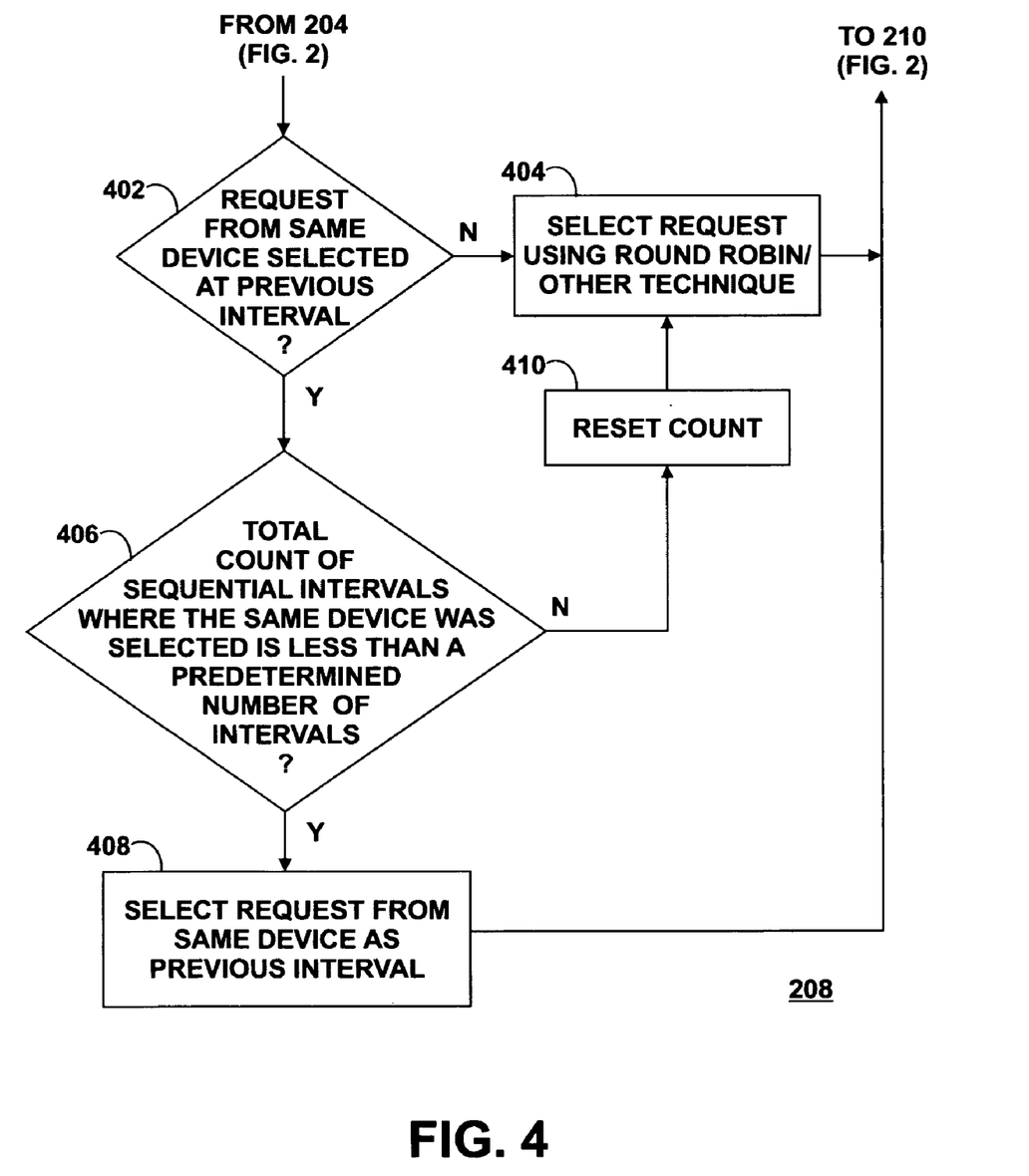
FIG. 4 is a flow diagram illustrating an exemplary implementation of the method of FIG. 2 based on previously selected memory access requests in accordance with at least one embodiment of the present disclosure.

| INTERVAL | DEVICE A | DEVICE B | DEVICE C | SELECTION |
|---|---|---|---|---|
| 0 | 0, Indicator | No Request | No Request | A |
| 1 | 0, Indicator | 0 | No Request | A |
| 2 | 0, Indicator | 0 | No Request | A |
| 3 | 0, Indicator | 0 | No Request | A |
| 4 | 0, Indicator | 0 | No Request | B |
| 5 | 0, Indicator | No Request | No Request | A |
| 6 | No Request | No Request | No Request | None |
| 7 | 0, Indicator | No Request | No Request | A |
| 8 | 0, Indicator | 1 | No Request | A |
| 9 | 0, Indicator | 1 | 3 | C | predetermined maximum number (e.g., maximum of two intervals or four intervals). In the event that the predetermined maximum number is not exceeded, the memory access request from the device is selected at block 408 for processing by the memory controller. Otherwise, the count value for the device is reset (e.g., set to 0) at block 410 and a memory access request from another device can be selected using another scheme at block 404. To illustrate, assuming that the predetermined maximum number is four and memory access requests from the device were selected for the last three memory access intervals, the current memory access request from the device can be selected at block 408 because the total number of memory access requests from the device selected in the previous sequence of memory access intervals is less than the predetermined maximum. If, however, memory access requests from the device were selected for the last four memory access intervals and the predetermined maximum is four intervals, then the count associated with the device would be reset at block 410 and a memory access request from another device selected at block 404.

In one embodiment, the sequential selection of memory access requests from the same device may be interrupted if a higher priority memory access request is received from another device. In other embodiments, the sequential selection of memory access requests from the same device can supercede a higher-priority memory access request from another device. Moreover, the predetermined maximum number of repeated selections may vary depending on the priority of the memory access request from another device.

Table 2 illustrates an exemplary sequence of memory access intervals utilizing memory access arbitration as described with respect to FIG. 4. In the depicted example, each device may be selected twice in sequence before another device is selected of the same priority. The resulting request selection pattern typically reduces the number of page openings and page closings compared to conventional arbitration techniques.

TABLE 2

| INTERVAL | DEVICE A PRIORITY | DEVICE B PRIORITY | DEVICE C PRIORITY | DEVICE D PRIORITY | DEVICE E PRIORITY | CONVENTIONAL SELECTION | IMPROVED SELECTION |
|---|---|---|---|---|---|---|---|
| 0 | 0 | 2 | 2 | 0 | No Request | Device B | Device B |
| 1 | 0 | 2 | 2 | 1 | No Request | Device C | Device B |
| 2 | 0 | 2 | 2 | 1 | No Request | Device B | Device C |
| 3 | 0 | 2 | 2 | 0 | No Request | Device C | Device C |
| 4 | 0 | No Request | No Request | 0 | No Request | Device A | Device A |
| 5 | 0 | No Request | No Request | 0 | No Request | Device D | Device A |
| 6 | 0 | No Request | No Request | 0 | No Request | Device A | Device D |
| 7 | 0 | 2 | 2 | 0 | No Request | Device B | Device B |
| 8 | 0 | 2 | 2 | 0 | No Request | Device C | Device B |
| 9 | 0 | 2 | 2 | 0 | No Request | Device B | Device C |
| 10 | 0 | 2 | 2 | 0 | 3 | Device E | Device E |

Figure 5:
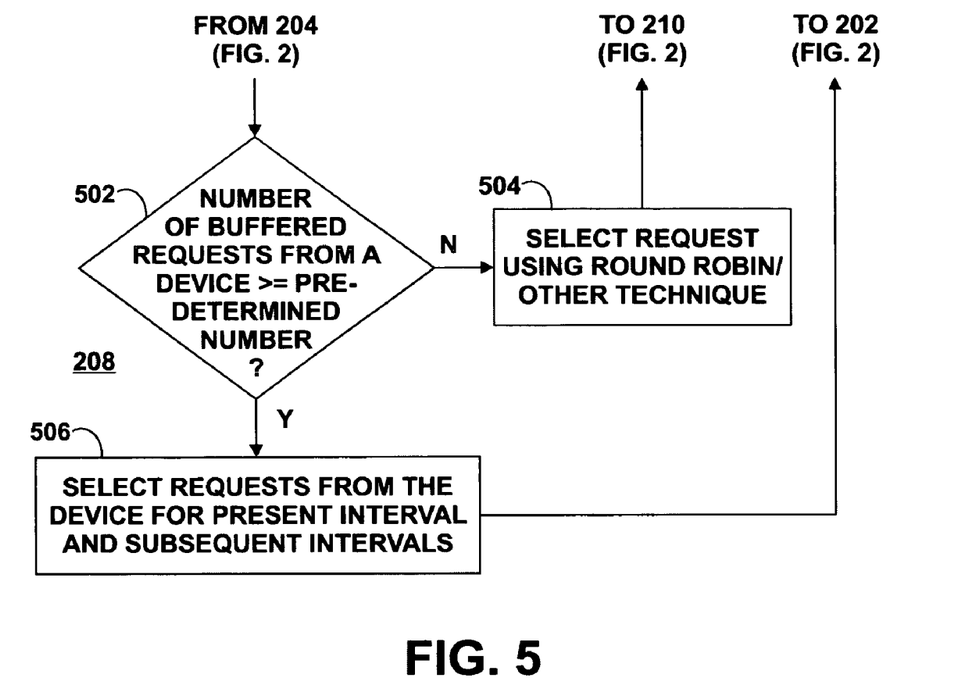
FIGS. 5 and 6 are flow diagrams illustrating an exemplary implementation of the method of FIG. 2 based on buffered memory access requests in accordance with at least one embodiment of the present disclosure.

As depicted by FIG. 4, another implementation of the preferential memory access request selection at block 208 can include determining whether a memory access request is available from the same device associated with the memory access request selected for the previous memory access interval at block 402. If no such memory access request is available, at block 404 a memory access request can be selected using any of a variety of schemes, such as by round robin selection. Otherwise, a total count of the number of access request from the device was selected in sequence for the immediately previous memory intervals is compared to a As depicted by FIG. 5, another implementation of the preferential memory access request selection at block 208 can include determining whether a number of buffered memory access requests from any of the devices meets or exceeds a predetermined threshold at block 502. If not, at block 504 a memory access request is selected from the devices using, for example, round robin selection or another selection scheme. Otherwise, at block 506 some or all of the buffered memory access requests are provided to the memory controller by the arbiter for processing during sequential memory access intervals.

Tables 3 and 4 respectively illustrate an conventional sequence of memory accesses and exemplary sequence of memory access intervals utilizing memory access arbitration as described with respect to FIG. 5. In the depicted example of Table 4, each device is to buffer two memory access request before it is selected. The resulting request pattern illustrated by Table 4 is likely to result in fewer page openings and page closings than conventional techniques illustrated by Table 3, and thereby reducing delays in processing.

TABLE 3

(Prior Art)

| INTER-VAL | DEVICE A | DEVICE B | DEVICE C | CONVENTIONAL SELECTION |
|---|---|---|---|---|
| 0 | No Request | No Request | No Request | None |
| 1 | 0 | No Request | No Request | A |
| 2 | No Request | 1 | No Request | B |
| 3 | No Request | No Request | No Request | None |
| 4 | 0 | No Request | No Request | A |
| 5 | No Request | No Request | 3 | C |
| 6 | No Request | 1 | No Request | B |
| 7 | 0 | No Request | No Request | A |
| 8 | No Request | No Request | No Request | None |
| 9 | 0 | No Request | 3 | C |

TABLE 4

| INTERVAL | DEVICE A | DEVICE B | DEVICE C | IMPROVED SELECTION |
|---|---|---|---|---|
| 0 | No Request | No Request | No Request | None |
| 1 | No Request | No Request | No Request | None |
| 2 | No Request | No Request | No Request | None |
| 3 | 0 | No Request | No Request | A |
| 4 | 0 | No Request | No Request | A |
| 5 | No Request | 1 | 3 | C |
| 6 | No Request | 1 | No Request | B |
| 7 | No Request | 1 | No Request | B |
| 8 | 0 | No Request | No Request | A |
| 9 | 0 | No Request | 3 | C |

Figure 6:
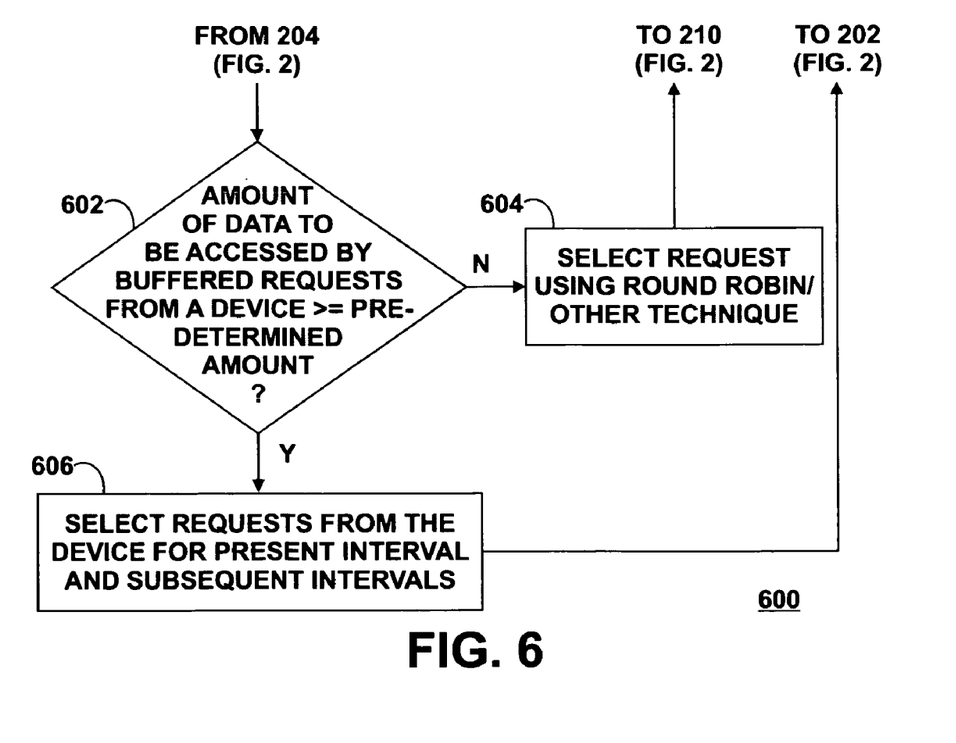

Similarly, as depicted by FIG. 6, another implementation of the preferential memory access request selection at block 208 can include determining whether the read or write data represented by buffered memory access requests from any of the devices meets or exceeds a predetermined data threshold at block 602. If not, at block 604 a memory access request is selected from the devices using, for example, round robin selection or another selection scheme. Otherwise, at block 606 some or all of the buffered memory access requests are provided to the memory controller by the arbiter for processing during sequential memory access intervals.

Figure 7:
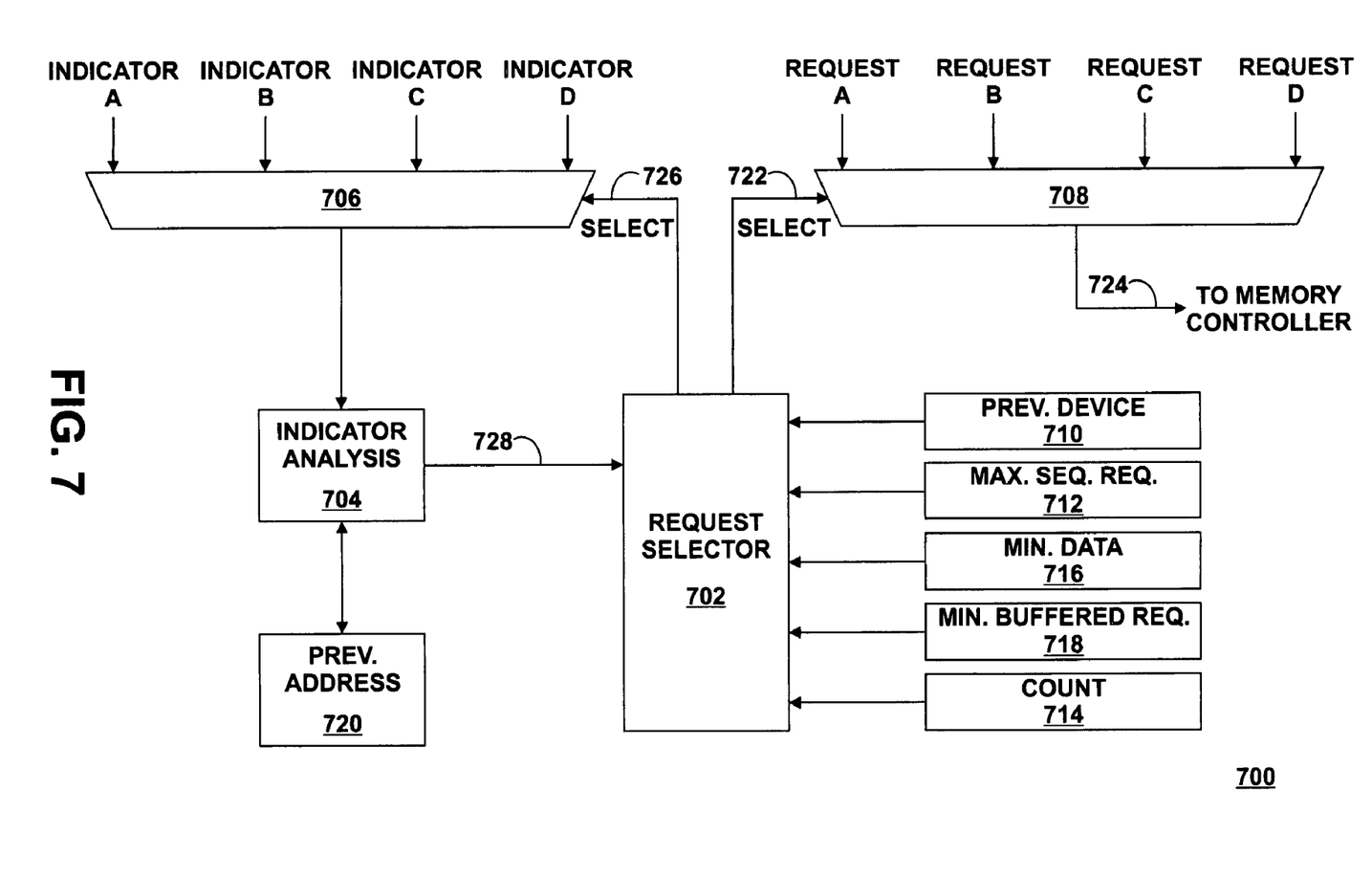
FIG. 7 is a block diagram illustrating an exemplary memory access arbiter in accordance with at least one embodiment of the present disclosure.

Referring to FIG. 7, an exemplary arbiter 700 for implementing one or more of the arbitration techniques disclosed herein is illustrated in accordance with at least one embodiment of the present disclosure. As depicted, the arbiter 700 can include a request selector module 702, an indicator analysis module 704, multiplexers 706 and 708, and registers 710, 712, 714, 716, 718 and 720. The modules 702 and 708 may be implemented as software, hardware, firmware, or combinations thereof. The register 710 stores a value identifying the device associated with the memory access request selected for the previous memory access interval. The register 712 stores a value representative of the maximum number of times a memory access can be sequentially selected from the same device and the register 714 stores a value representative of the count of the number of times memory access requests have been sequentially selected for the immediately previous memory access intervals. The register 716 stores a value representative of a predetermined data threshold associated with buffered memory access requests and the register 718 stores a value representative of a predetermined number of memory access requests associated with a memory access request buffer. The register 720 stores a value representative of the memory address associated with the memory access request selected for the previous memory access interval. The values of one or more of the registers 712, 714, 716 and 718 may be programmable so as customize the memory access request arbitration scheme employed by the arbiter 700 to the particular characteristics of the operation of the processing device (e.g., SOC 102, FIG. 1).

In operation, one or more memory access requests A-D (from devices A-D, respectively) are received at multiplexer 708. Based on input from the indicator analysis module 704 and/or the values of one or more of the registers 710, 712, 714, 716, 718 and 720, the request selector module 702 determines which of the memory access requests A-D is to be selected for provision to a memory controller and provides a corresponding select signal 722 to the multiplexer 708 to direct the multiplexer 708 to output the selected memory access request as output 724 for receipt by the memory controller.

In one embodiment, as discussed with respect to FIG. 4, the request selector module 702 preferentially selects the memory access request associated with the device indicated by the register 710 (i.e., the device associated with the memory access request selected for the previous memory access interval) and increments the count value in register 714 unless the count value in register 714 meets or exceeds the maximum number represented by the value in register 712. Otherwise, the count value is reset and another selection scheme, such as round robin, may be used.

In another embodiment, as discussed with respect to FIGS. 5 and 6, the request selector module 702 preferentially selects one or more buffered memory access requests from a device when the total number of buffered memory access requests meets or exceeds the threshold represented by the value in register 718 or when the total amount of data to be accessed by the buffered memory access requests meets or exceeds the predetermined data threshold represented by the value stored in register 716.

Further, as discussed with respect to FIG. 3, the request selector module 702, in one embodiment, preferentially selects a memory access request from a device based on an indicator representing whether the memory access request is expected to access the same memory page as the memory access request selected for the previous memory access interval. To illustrate, the multiplexer 706 receives indicators A-D from devices A-D, respectively. In one embodiment, the indicators A-D represent a certain number of the most significant bits of the memory addresses associated with the corresponding memory access requests A-D. The request selector module 702 provides a select signal 726 to the multiplexer 706 to select in turn the provision of one of the indicators A-D to the indicator analysis module 704. The indicator analysis module 704 compares the selected indicator (e.g., the memory address subset) with the memory address value stored in the register 720 (representative of the memory address associated with the previously selected memory access request) to determine whether the corresponding memory access request is expected to access the same memory page as the previously selected memory access request. If so expected, the indicator analysis module 704 provides select signal 728 to the request selector module 702 to indicate which memory access request of which device is expected to access the same memory page as the previously selected memory access request. In response, the request selector module 702 provides the corresponding select signal 722 to the multiplexer 708 so as to select the corresponding memory access request for provision to the memory controller as output 724.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   receiving at least one memory access request from each device of a plurality of devices; and
   preferentially selecting buffered memory access requests from a first device of the plurality of devices over memory access requests from other devices of the plurality of devices for sequential provision to a multiple-page memory in response to determining that a number of the buffered memory access requests of the first device is greater than or equal to a predetermined number of memory access requests and that a total amount of data to be accessed by the buffered memory access requests is greater than or equal to a predetermined amount of data.

2. The method of claim 1, further comprising:
   selecting a first memory access request from a second device for provision to the multiple-page memory for a first interval;
   preferentially selecting one or more memory access requests from the second device for provision to the multiple page memory for each interval of one or more intervals immediately subsequent to the first interval, wherein a total number of intervals preferentially selected is less than a predetermined number of intervals.

3. The method of claim 2, wherein the predetermined number of intervals is programmable.

4. The method of claim 2, wherein the predetermined number of intervals is two intervals or four intervals.

5. The method of claim 1, wherein the predetermined number of memory access requests is programmable.

6. The method of claim 1, wherein the predetermined amount of data is programmable.

7. The method of claim 1, further comprising:
   receiving a first memory access request from a second device during a second interval, the first memory access request to access a first page of the multiple-page memory;
   receiving a second memory access request from the second device during a third interval immediately subsequent to the second interval;
   receiving a third memory access request from a third device during the third interval; and
   preferentially selecting the second memory access request over the third memory access request for provision to the multiple-page memory if an indicator indicates the second memory access request is expected to access the first page of the multiple-page memory, and wherein the indicator is received from the first device.

8. The method of claim 7, wherein the indicator includes a first subset of the most significant bits of an address associated with the second memory access request, and wherein the second memory access request is expected to access the first page if the first subset of the most significant bits are the same as a corresponding subset of the most significant bits of an address associated with the first memory access request.

9. The method of claim 1, wherein the multiple-page memory comprises a dual-data rate dynamic random access memory.

10. A system comprising:
    an access arbiter coupled to a multiple-page memory, wherein the access arbiter is to:
    receive at least one memory access request from each device of a plurality of devices; and
    preferentially select buffered memory access requests from a first device of the plurality of devices over memory access requests from other devices of the plurality of devices for sequential provision to a multiple-page memory in response to determining a total amount of data to be accessed by the buffered memory access requests is greater than or equal to a predetermined amount of data.

11. The system of claim 10, wherein the access arbiter further is to:
    select a first memory access request from a second device for provision to the multiple-page memory for a first interval; and
    preferentially select one or more memory access requests from the second device for provision to the multiple-page memory for each interval of one or more intervals immediately subsequent to the first interval, wherein a total number of intervals preferentially selected is less than a predetermined number of intervals.

12. The system of claim 10, wherein the access arbiter further is to:
    preferentially select memory access requests buffered at a fourth device for sequential provision to the multiple-page memory in response to determining that a number of the buffered memory access requests of the first device is greater than or equal to a predetermined number of memory access requests.

13. The system of claim 10, wherein the multiple-page memory comprises a dual-data rate dynamic random access memory.

14. A method comprising:
    receiving at least one memory access request to access a multiple page memory from each device of plurality of devices during a first interval; and
    preferentially selecting buffered memory access requests from a first device of the subset over memory access requests from other devices of the subset for sequential provision to the multiple-page memory in response to determining that a total amount of data to be accessed by the buffered memory access requests is greater than or equal to a predetermined amount of data.

15. The method of claim 14, wherein the predetermined amount of data is programmable.

* * * * *